United States Patent [19]

Street

[11] Patent Number: 5,229,154
[45] Date of Patent: Jul. 20, 1993

[54] PROCESS FOR PRESERVING MASHED POTATOES IN SEALED CONTAINERS

[75] Inventor: Steven C. Street, Caribou, Me.

[73] Assignee: Interstate Food Processing Corporation, Fort Fairfield, Me.

[21] Appl. No.: 725,972

[22] Filed: Jul. 5, 1991

[51] Int. Cl.$^5$ .............. B65B 55/14; B65B 31/00; A23L 3/16; A23L 3/3418

[52] U.S. Cl. .............. 426/392; 426/399; 426/418; 426/637; 426/518; 426/521

[58] Field of Search .............. 426/637, 486, 518, 392, 426/399, 418, 521

[56] References Cited

U.S. PATENT DOCUMENTS

| | | | |
|---|---|---|---|
| 2,166,278 | 7/1939 | Alderfer | 426/637 |
| 2,597,067 | 5/1952 | Chase | 426/518 |
| 2,830,911 | 4/1958 | Fogelberg | 426/486 |
| 3,220,857 | 11/1965 | Hollis et al. | 426/637 |
| 3,266,905 | 8/1966 | Baker et al. | 426/486 |
| 3,343,970 | 9/1967 | Pader et al. | 426/637 |
| 3,773,527 | 11/1973 | Ruggerong | 426/637 |
| 3,821,448 | 6/1974 | Parker et al. | 426/486 |
| 3,830,949 | 8/1974 | Shatila | 426/637 |
| 3,917,866 | 11/1975 | Purves et al. | 426/637 |
| 3,959,501 | 5/1976 | Shatila | 426/637 |
| 3,975,551 | 8/1976 | Shatila | 426/637 |
| 4,007,286 | 2/1977 | Ooraikul | 426/637 |
| 4,135,003 | 1/1978 | Mohwinkel | 426/637 |
| 4,156,744 | 5/1979 | Kiploks et al. | 426/637 |
| 4,228,196 | 10/1980 | Weaver et al. | 426/637 |
| 4,241,094 | 12/1980 | O'Neil et al. | 426/637 |
| 4,419,375 | 12/1983 | Willard et al. | 426/637 |
| 4,579,743 | 4/1986 | Hullah | 426/637 |
| 4,810,660 | 3/1989 | Willard | 426/637 |

*Primary Examiner*—Steven Weinstein
*Attorney, Agent, or Firm*—Larson & Taylor

[57] ABSTRACT

A new method for fresh, refrigerated mashed potatoes is disclosed. The method features overcooking potatoes until they do not gel after cooling, with later grinding, blending, pasteurizing, chilling, injecting with an inert gas, packaging and refrigerated storing. The blending, pasteurizing, chilling and injecting steps are performed in a closed system wherein the potato mixture is not exposed to the open atmosphere in order to minimize contamination and maximize shelf life.

6 Claims, No Drawings

PROCESS FOR PRESERVING MASHED POTATOES IN SEALED CONTAINERS

BACKGROUND OF THE INVENTION

1. Technical Field

This invention generally relates to a method of preparing and preserving fresh, refrigerated mashed potatoes in sealed containers, and more particularly to a method or process of preparing fresh mashed potatoes for storage in sealed containers for extended periods of time under refrigerated conditions.

2. Background Art

Since the introduction of the potato to western civilization in the mid 1500's, the traditional method of preparing potatoes for human consumption has been for the consumer to purchase them as fresh, unpeeled produce, which are then washed, peeled, cut and cooked for consumption. This process tales anywhere from 30 to 60 minutes and has always been considered a rather time consuming chore. As a result, commercially prepared potato products are immensely popular with the consuming public, since these time consuming tasks are performed at a processing plant, thus saving the consumer considerable time and effort. This has resulted in explosive growth in the frozen potato product industry. However, while frozen potato products are easily preserved for extended periods of time, they are generally considered to be of inferior quality and taste when compared to fresh, refrigerated potato products.

The problem has been, and always will be, that the atmosphere in which we live is highly contaminated with microbial organisms, such as yeast and bacteria. These microorganisms thrive in the atmosphere at ambient temperatures, and to a lesser degree, at refrigerated temperatures in the 32° F. to 38° F. range. This is not a significant problem for frozen potato products, since at the lower freezing temperatures growth of microbial organisms is effectively inhibited.

With fresh, refrigerated potato products, there have been two basic methods of reducing spoilage during extended refrigerated storage, these have been: first, to eliminate or drastically reduce the number of organisms present with the food product before storage; second, to eliminate the atmospheric conditions which permit growth.

One past method to reduce the number of organisms present has been the addition of additives, most commonly sodium bisulfite, as a source of sulfur dioxide to retard nonenzymatic browning. A second method to reduce the number of organisms present has been the addition of monoglyceride emulsifier, which functions as an anti oxidant, and sodium acid pyrophosphate, which reacts with trace amounts of iron to prevent after-cooking discoloration. However, the federal government and many states have enacted legislation or established regulations which drastically limit the permissive use of these additives, and as a result their effectiveness will be more limited.

Blanching or raising the temperature of the vegetable product, has been found to reduce microorganisms found on the surface of whole or cut potato products.

The second solution is to eliminate the atmospheric conditions under which these organisms can grow and multiply. It has been known for a long time that preserving refrigerated food products in an inert atmosphere within an hermetically sealed container extends refrigeration shelf life for fresh food products. Such a method of preserving food products is disclosed in U.S. Pat. No. 1,821,106.

It is also known that it is possible to extend the refrigerated shelf life by depositing precooked potato pieces, from which micro organisms have been eliminated by the process of cooking, into packaging containers which have been flushed with mixtures of nitrogen and carbon dioxide, and sealed. Such a method is disclosed in Ruggerone, U.S. Pat. No. 3,773,527. And, cooking potatoes within the packaging to provide for an expulsion of the air within the package, as the product cools within the sealed packages, is disclosed in Mohwinkel, U.S. Pat. No. 4,135,003.

To date, reasonable success has been achieved in processing for extended refrigerated shelf life whole and cut potato pieces. The reason for this is that these products are particulate solids and successful effort has been directed toward the surface environments of the products with little attention directed toward the interior product cores which are presumably wholesome and not significantly at risk for contamination with microbial organisms.

Mashed potatoes, on the other hand, present an entirely different and unique set of problems. It has been known for years that in order to produce mashed potatoes, the potatoes must first be cooked, preferably at boiling water temperature, for approximately 30 to 35 minutes. The conventional teachings are quite clear that the potatoes should, under no circumstances be overcooked because overcooking will result in the release of free starch which will retrograde, upon cooling, to a sticky gel, which in turn will result in pasty or sticky mashed potatoes that are too viscous to commercially process easily and of an unacceptable texture, or mouth feel, for wide acceptance by the consuming public.

Again, using the conventional process, after the potatoes have been cooked, but not overcooked, the potatoes are then ground to break up the multicellular structure of the potatoes without breaking the individual cells apart, then mixed with either fresh milk or reconstituted milk, salt, and some sort of a fat, either butter or margarine, for flavoring. This addition of flavorings and moisturizers gives rise to another problem which is contaminated entrained air being present within the mashed potatoes. Removal of the entrained air is very difficult, if not impossible, and as a result commercially produced mashed potatoes, to date, have always suffered from an unacceptably short refrigerated shelf life.

Accordingly, it is an object of this invention to provide a process for preparing fresh mashed potatoes which have an extended refrigerated shelf life in the range of 6 to 8 weeks. The second object of this invention is to provide a process for producing fresh, refrigerated mashed potatoes of a pleasing texture, quality and color for an extended shelf life. A third object is to reduce the viscosity of the mashed potatoes and mashed potato mixture to the point that it is possible to pump them in a closed system during processing so that entrainment of air is minimized and pasteurization and refrigeration are feasible to reduce microbial contamination and extend shelf life. A fourth object is reduce the sticky or pasty texture at the time of consumption which is so prevalent in commercially processed mashed potatoes today.

DISCLOSURE OF INVENTION

These objects are achieved by use of a method of preparing mashed potatoes from whole peeled potatoes wherein peeled and washed potatoes or potato pieces are first overcooked for between 35 to 40 minutes at the boiling temperature for water. The exact time for overcooking is dependent upon the size of the potatoes, their total solids content and variety. The criteria for the amount of overcooking is that the potatoes must be overcooked to the point where the starch paste formed during cooking will no longer retrograde to form a gel when later cooled.

The potatoes are then augured into a sizing unit, typically a grinder, to reduce cellular structure and passed through two screens having openings of about 5/16 inch and ¼ inch to reduce the multicellular structure to single cellular structure with a minimum of cell breakage.

Thereafter, the ground potatoes are augured into a blending tank where margarine or butter are added at the rate of between 1% and 2% by weight, salt at the rate of between 25 and 250 ppm, and either milk or a mixture of powdered milk and water at the rate of between 2% and 4% by weight.

The blend is then mixed to a homogenized mixture which is pumped into a plate and frame, or swept surface, heat exchanger, in an environment where it is no longer exposed to atmosphere. The mixture is then pasteurized in the heat exchanger at an elevated temperature of between 192° F. to 210° F. for a period of between 8 and 12 minutes.

The homogenized and pasteurized mashed potato mixture is then quickly chilled in a second plate and frame, or swept surface heat exchanger, to a temperature range of between 38° F. to 45° F., and pumped into an inert gas injection device, wherein an inert gas mixture, preferably containing nitrogen, is injected into the mashed potato mixture at a maximum rate of 1% by volume.

The chilled, injected mashed potato mixture is then packaged in gas and water impermeable sealed containers and quickly cooled to 34° F. and then held in sealed containers at refrigerated temperatures of between about 33° F. and 38° F.

BEST MODE FOR CARRYING OUT INVENTION

In the preferred embodiment, whole potatoes are first peeled using any of the commercially feasible peeling processes which include steam peeling, abrasion peeling, lye peeling or infrared dry-caustic peeling. They are then washed. Thereafter, they are introduced by means of a screw conveyor into a direct steam injection cooker. Here the potatoes are overcooked at a temperature of 212° for 35 to 40 minutes. The criteria for the amount of overcooling is that they should be overcooked to the point where the swollen starch granules and free amylose molecules will no longer function as binding agents and retrograde into high viscosity gelatin upon later cooling. This is opposite to the conventional teachings which caution against overcooking so as to minimize cell breakage and the release of free starches, namely amylose and amylopectin.

There are two basic types of starch leucoblast granules present in the potato cytoplasm, namely amylose and amylopectin. Amylose is a linear chain of glucose molecules and amylopectin is a branched chain of glucose molecules. In the typical potato, 17% to 23% of the starch is amylose, with the remainder being amylopectin. These two different types of starches exhibit different characteristics when heated in water and then recooled. Amylose becomes cloudy when heated with water and is capable of forming a gel. Amylopectin remains clear when heated with water, and does not gel. As the mixture of these starches from the potato are heated they absorb water molecules and swell enormously and soften, forming first a gel and then a paste. It is this gelatinization and pasting that is the significant problem in the preparation of commercially processed mashed potatoes.

I found that the overcooking to the point of preventing retrogradation stabilizes the viscosity of the resulting homogenized mashed potato mixture such that it is possible to reheat the mixture in a pasteurization process, recool it, refrigerate it for storage, and subsequently reheat it again for preparation and serving, all without any appreciable changes in viscosity or 'stickiness'.

Since there are so many variables with regard to the length of time that is required to overcook the potatoes, the exact amount of time has to be empirically determined. Cooking times vary anywhere from 15 to 60 minutes, depending upon the size and solid contents of the potatoes, an average minimum being about 35 minutes if the variety of potato being used is a russet burbank and somewhat less if the variety of potato being used has an average solid content of less than 20% by weight.

After overcooking, the potatoes are augured to a grinder, where they are mashed through two screens having openings of approximately 5/16 to ¼ of an inch, although satisfactory results may also be achieved by using a grinder having screen holes as large as one half inch.

The ground potatoes are then transported into an additive blending machine wherein salt at the rate of 25 ppm to 250 ppm, margarine or butter at the rate of between 1% and 2% by weight, and milk or purified water and powdered milk, at the rate of 2% to 4% by weight, are added to the ground potatoes as flavorings and moisturizers to form a homogenized mixture of mashed potatoes.

The mashed potato mixture is next introduced into the suction of a pump and from this point on in my process the mashed potato mixture is worked on in a closed system, wherein it is no longer exposed to contamination from the open atmosphere until the packaging step. The potato mixture is pumped through the pump into a plate and frame heat exchanger wherein it is pasteurized. Pasteurization is accomplished by heating the mashed potato mixture in the plate and frame heat exchanger to a temperature of between 192° F. to 210° F. for between 8 to 12 minutes.

After pasteurization, the mashed potato mixture is pumped into a second plate and frame heat exchanger and quickly chilled to a temperature within the range of 38° F. to 45° F., preferably within ten minutes of the completion of pasteurization and pumped from the cooler to an inert gas injection device, wherein nitrogen is blown into the mixture at the rate of about 0.01% by volume. The nitrogen functions during final container packaging as a preservative, a brightening agent, and also serves to reduce the viscosity and stickiness of the mashed potato mixture.

The mixture is then packaged in water and air impermeable sealed containers and quickly chilled to a temperature of about 34° F.

Thereafter, the packages containing the mashed potato mixture are held refrigerated, within a temperature range of between about 32° F. to 38° F. I have found that mashed potato mixtures so processed have a normal refrigerated shelf life of between six to eight weeks.

While there is shown and described the present preferred embodiment of the invention, it is to be distinctly understood that this invention is not limited thereto but may be variously embodied to practice within the scope of the following claims.

I claim:

1. A method of preparing and packaging mashed potatoes from whole peeled potatoes comprising the steps of:
    (a) overcooking whole peeled potatoes in an aqueous environment at the boiling temperature for water, said overcooking being for a time and temperature beyond the conventional point where cooking is conventionally stopped in the processing of mashed potatoes to prevent retrogradation of starch pastes upon cooling of the potatoes and to the point where swollen starch granules and free amylose molecules in the overcooked potatoes will no longer function as binding agents and retrograde into a high viscosity gel upon later cooling;
    (b) sizing the cooked potatoes to reduce the cellular structure and produce mashed potatoes;
    (c) adding flavorings and moisturizers to said mashed potatoes;
    (d) homogenizing a mixture of said mashed potatoes, flavorings and moisturizers;
    (e) pasteurizing said homogenized mashed potatoes;
    (f) chilling said pasteurized mashed potatoes;
    (g) injecting an inert gas into the chilled mashed potatoes;
    (h) packaging the injected mashed potatoes in a gas impermeable, sealed container; and
    (i) refrigerating the packaged mashed potatoes at a range of 32° F. to 38° F.,
said steps of homogenizing, pasteurizing, chilling and injecting of inert gas being performed in a closed system wherein the mashed potatoes are not exposed to the open atmosphere.

2. The method of claim 1 wherein the pasteurizing comprises the steps of heating the mashed potatoes to a temperature within the range of 192° F. to 210° F. and holding the mashed potatoes at that elevated temperature for between 8 to 12 minutes.

3. The method of claim 2, wherein the chilling of the mashed potatoes after pasteurization is accomplished within ten minutes of the completion of pasteurization.

4. The method of claim 1 wherein said step of adding flavorings and moisturizers comprises adding margarine or butter at a rate of about 1% by weight to the mashed potatoes, adding salt at a rate of about 100 ppm to the mashed potatoes and adding milk or a mixture of powdered milk and purified water at a rate of about 2% by weight to the mashed potatoes.

5. The method of claim 1 wherein said step of chilling comprises chilling said pasteurized mashed potatoes to a temperature within the range of 38° F. to 45° F.

6. The method of claim 1 wherein said step of injecting comprises injecting an inert gas into the chilled mashed potatoes at a rate of at least 0.1% by volume.

* * * * *